United States Patent [19]
Sugiyama et al.

[11] Patent Number: 6,053,257
[45] Date of Patent: Apr. 25, 2000

[54] HYDRAULIC PRESSURE TAKEOUT APPARATUS FOR A TRACTOR

[75] Inventors: Kazuomi Sugiyama, Sakai; Hideo Ookura, Hashimoto; Hideaki Douzono, Sakai; Tadahito Suzui, Sakai; Kaoru Fujikawa, Sakai; Kengo Satou, Sakai, all of Japan

[73] Assignee: Kubota Corporation, Osaka, Japan

[21] Appl. No.: 09/122,919

[22] Filed: Jul. 27, 1998

[30] Foreign Application Priority Data

Aug. 13, 1997 [JP] Japan .................................. 9-218597

[51] Int. Cl.⁷ ...................................................... E02F 3/74
[52] U.S. Cl. ............................................. 172/465; 172/316
[58] Field of Search .......................... 37/348, 420; 172/3, 172/4, 465, 316, 439; 180/287, 419, 420; 56/6, 7; 91/514, 516, 532

[56] References Cited

U.S. PATENT DOCUMENTS

| | | | |
|---|---|---|---|
| 4,050,596 | 9/1977 | Zeuner et al. ........................... | 414/131 |
| 4,570,425 | 2/1986 | Carr .......................................... | 56/7 |
| 5,479,845 | 1/1996 | Kawamura et al. ...................... | 91/514 |
| 5,577,435 | 11/1996 | Kowalyk et al. ........................ | 91/516 |

FOREIGN PATENT DOCUMENTS

| | | |
|---|---|---|
| 215704 | 2/1990 | Japan . |
| 8280206 | 7/1995 | Japan . |

*Primary Examiner*—Robert E. Pezzuto
*Attorney, Agent, or Firm*—Webb Ziesenheim Logsdon Orkin & Hanson, P.C.

[57] ABSTRACT

A hydraulic pressure takeout apparatus for use on a tractor having a hydraulic device with right and left lift arms for raising and lowering a working implement. The hydraulic pressure takeout apparatus includes a valve assembly mounted on a hydraulic housing forming part of the hydraulic device, and between the right and left lift arms. With this construction, oil lines for transmitting pressure oil to the valve assembly are not exposed to the outside, which is particularly advantageous where the tractor frequently engages in an operation on wet, soft soil. The valve assembly may be maintained with facility, and oil leakage is unlikely. Where the valve assembly is mounted on the hydraulic housing through a spacer defining connecting oil lines therein, oil leakage is prevented with increased assurance. The valve assembly may include a plurality of valves stacked one upon another to enable multiple or multi-purpose hydraulic pressure takeout.

6 Claims, 14 Drawing Sheets

HYDRAULIC PRESSURE TAKEOUT APPARATUS FOR A TRACTOR

BACKGROUND OF THE INVENTION

1. Technical Field of the Invention

This invention relates to a hydraulic pressure takeout apparatus for a tractor to which a hydraulic working implement may be coupled. More particularly, the invention relates to an apparatus for taking hydraulic pressure for driving a working implement from a tractor including a hydraulic device having right and left lift arms for raising and lowering the working implement.

2. Prior Art of the Invention

The technique of providing a hydraulic pressure takeout apparatus for a tractor including a hydraulic device having right and left lift arms for raising and lowering a working implement is known, for example, from Japanese Utility Model Publication H2-15704 (Utility Model Laying-Open Publication S61-87128: Conventional Example 1) and Japanese Patent Laying-Open Publication H8-280206 (Conventional Example 2).

Conventional Example 1 addresses the problem that the lift arms, top link and mounting bases thereof projecting rearward from the hydraulic device or tractor body are obstructive to operations to connect and disconnect hydraulic hoses of a working implement to/from hydraulic pressure takeout units on the tractor body. To solve this problem, Conventional Example 1 provides a support projecting rearward from an upper rear position of the tractor body and/or the rear surface of the hydraulic device, and hydraulic pressure takeout units attached to the support. The pressure takeout units are disposed between a region of pivotal movement of the top link and regions of pivotal movement of the lift arms.

Conventional Example 2 addresses the problem that, depending on the mounting position of a sub-control valve (valve for hydraulic pressure takeout), a complicated piping is required between this valve and hydraulic ports, which is intertwined with pipings extending to other valves to render a maintenance operation difficult. To solve this problem, Conventional Example 2 provides a flow dividing valve and a roll control valve attached to one side of a cylinder case containing a lift cylinder, and a main control valve for controlling the lift cylinder and the sub-control valve attached to the other side of the cylinder case. With this construction, the hydraulic pipes may have reduced lengths since the control valves are arranged close to the lift cylinder.

Conventional Examples 1 and 2 are useful in themselves, but still leave the following problems to be solved.

In Conventional Example 1, an auxiliary hydraulic control valve is formed integrally with and extending transversely from the left surface of a forward portion of the hydraulic housing (cylinder case) acting as the hydraulic device for raising and lowering the working implement. This control valve and the hydraulic pressure takeout units are connected by right and left pipings. This construction has the following problems:

(1) An operation for arranging the right and left pipings is troublesome.

(2) The right and left pipings are exposed, and mud and muddy water could adhere thereto particularly when the tractor works on wet, soft soil.

(3) The auxiliary hydraulic control valve is disposed in a deep interior of a rear fender, which makes maintenance work troublesome. Maintenance is practically impossible when the valve is covered with mud and muddy water.

In Conventional Example 2, the sub-control valve (valve for hydraulic pressure takeout) having hydraulic ports (hydraulic pressure takeout units) is mounted on the upper surface of a rear portion of the hydraulic housing (cylinder case). Thus, the problem (3) of Conventional Example 1 is solved, but the following problems remain:

(4) Right and left pipings are connected to the sub-control valve.

The problems (1) and (2) remain unsolved.

(5) An operation to maintain the sub-control valve requires connection and disconnection of this valve and the right and left pipings. Such an operation is troublesome particularly when the pipings are bent. Moreover, oil leakage could easily occur from a defective connection.

SUMMARY OF THE INVENTION

A primary object of this invention is to provide a hydraulic pressure takeout apparatus for a tractor which solves the problems noted above.

The above object is fulfilled, according to this invention, by a hydraulic pressure takeout apparatus for use on a tractor having a hydraulic device with right and left lift arms and a hydraulic housing for raising and lowering a working implement, comprising a hydraulic pressure takeout valve assembly mounted on the hydraulic housing and between the right and left lift arms, and oil lines formed in the hydraulic housing and communicating with the hydraulic pressure takeout valve assembly.

With the above construction, the oil lines for transmitting pressure oil to the valve assembly are, unlike pipings, not exposed to the outside. Thus, the valve assembly may be maintained with facility, and oil leakage is unlikely. Where the valve assembly includes quick couplers acting as hydraulic pressure takeout units, hydraulic pressure may easily be taken out for hydraulic equipment and/or hydraulic working implement. This promotes multifunctioning of the tractor without impairing operation of the hydraulic device for raising and lowering the working implement.

In this invention, the valve assembly may be mounted directly on the hydraulic housing (e.g. placed in contact with the housing and bolted thereto). However, the valve assembly may be mounted by using a spacer having connecting oil lines, which is advantageous in reliably preventing oil leakage.

Only one such valve may be provided, but a plurality of valves stacked one upon another will enable multiple pressure takeout to advantage. These valves may be arranged vertically or horizontally to realize a compact pressure takeout apparatus serving multiple purposes.

In this invention, a plurality of valves may be stacked with the spacer having connecting oil lines which may be positioned accurately to the above oil lines. Consequently, while maintenance is carried out with ease, a misalignment of the valves may be avoided in time of maintenance work.

Other features, functions, effects and advantages of the present invention will be appreciated upon reading the following description with reference to the drawings.

BRIEF DESCRIPTION OF THE DRAWINGS

FIGS. 1 through 14 show a tractor having a hydraulic pressure takeout apparatus in a first embodiment of this invention, in which:

FIG. 1 is a side view of the tractor;

FIG. 2 is an enlarged side view showing a rear portion of the tractor shown in FIG. 1;

FIG. 3 is a side view of a hydraulic device, with the hydraulic pressure takeout apparatus, for raising and lowering a working implement;

FIG. 4 is a plan view of the hydraulic device shown in FIG. 3;

FIG. 5 is a rear view of a principal portion of the hydraulic device;

FIG. 6 is a schematic view of a hydraulic circuit;

FIG. 7 is a plan view of a spacer;

FIG. 8 is a front view of the spacer;

FIG. 9 is a side view of the spacer;

FIG. 10 is a sectional view taken on line X—X of FIG. 7;

FIG. 11 is a sectional view taken on line XI—XI of FIG. 7;

FIG. 12 is a sectional view taken on line XII—XII of FIG. 7;

FIG. 13 is a sectional view taken on line XIII—XIII of FIG. 7; and

FIG. 14 is a sectional view of a hydraulic lift controller.

FIGS. 15 through 18 show a hydraulic pressure takeout apparatus applied to a different type of tractor with a canopy in a second embodiment of this invention, in which:

FIG. 15 is a side view of the tractor,

FIG. 16 is a side view of a principal portion of the tractor shown in FIG. 15;

FIG. 17 is a plan view of the principal portion; and

FIG. 18 is a rear view of the principal portion.

DESCRIPTION OF THE PREFERRED EMBODIMENTS

Preferred embodiments of this invention will be described hereinafter.

Figure 1:
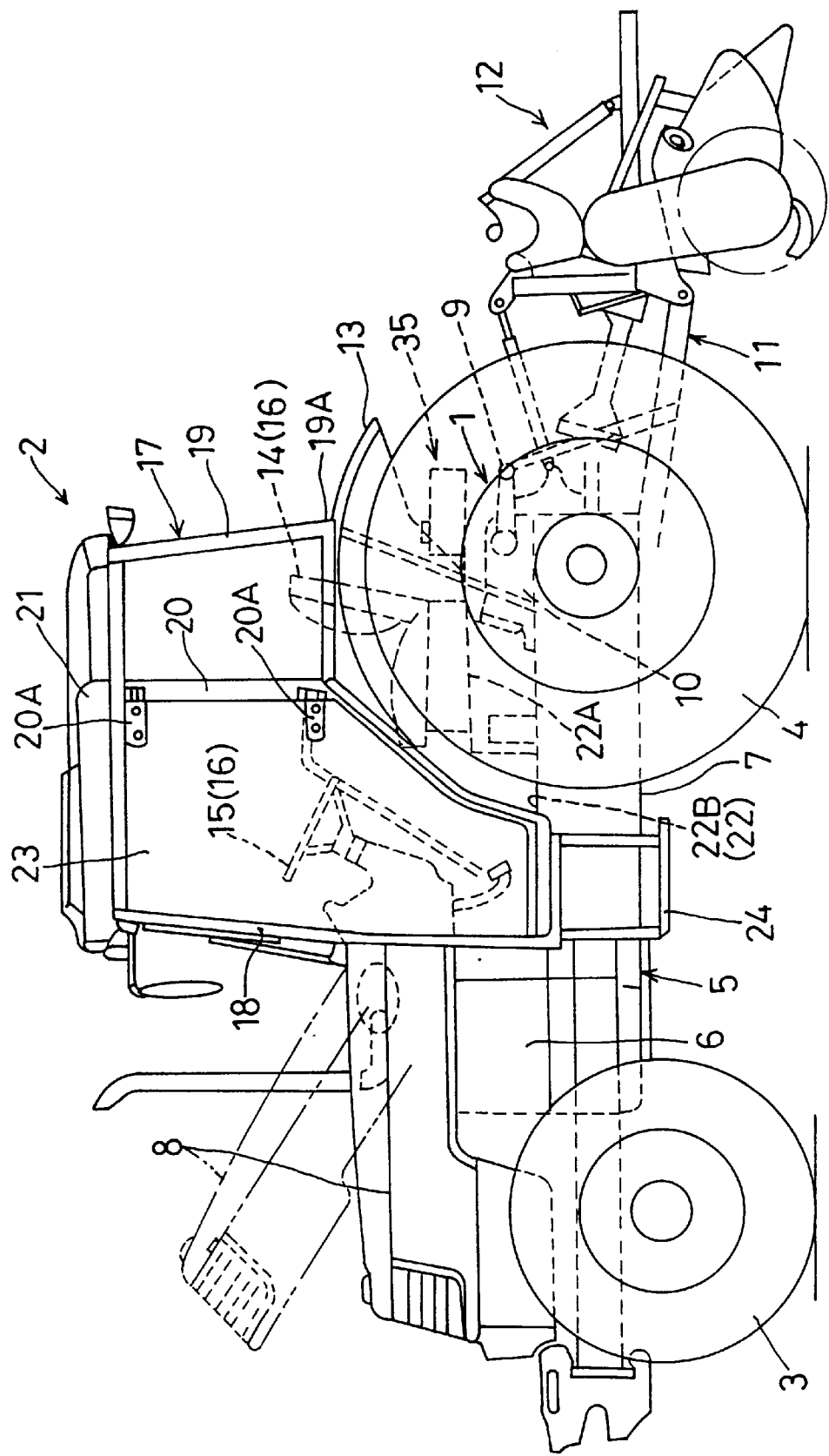

FIG. 1 shows an elevation of a four wheel drive tractor 2 having a hydraulic pressure takeout apparatus 1 according to this invention. The tractor 2 has right and left front wheels 3 and right and left rear wheels 4. The front wheels 3 are dirigible drive wheels. The tractor 2 may be switched to a two wheel drive mode, as necessary, by breaking drive transmission to the front wheels 3.

A tractor body 5 has an engine 6 mounted thereon, and a transmission case 7 connected to the rear of engine 6 through a clutch housing (not shown). The engine 6 and engine-related components such as a radiator (not shown) disposed forwardly of the engine 6 are enclosed in an openable hood 8.

The tractor body 5 further includes a hydraulic device 10 mounted on an upper surface of a rear portion thereof and having right and left lift arms 9 for raising and lowering a working implement. In the illustrated example, a rotary implement 12 is detachably and vertically movably connected to the hydraulic device 10 through a three-point linkage 11.

Rear fenders 13 are erected inwardly of the right and left rear wheels 4, respectively, for covering the rear wheels 4. A driver's seat 14 is disposed between the rear fenders 13. The driver's seat 14 and a steering wheel 15 disposed forwardly thereof constitute a driving and steering control 16. The driving and steering control 16 is surrounded by a cab 17 removably mounted on the tractor body 5. The cab 17 includes the rear fenders 13.

The cab 17 has a box-like configuration with a pair of right and left front posts 18, a pair of right and left rear posts 19, intermediate posts 20 disposed closer to the rear posts 19 than to the front posts 18 and erected on the rear fenders 13, and a top cover 21. The top cover 21 supports an air-conditioner (not shown) for air-conditioning and ventilating the cab 17. The cab 17 further includes a bottom plate or floor sheet 22. The floor sheet 22 includes a seat support portion 22A for supporting the driver's seat 14, which portion 22A is elevated to a higher level than a forward portion 22B. The cab 17 has doors 23 pivotable to open and close on hinges 20A attached to the intermediate posts 20. The opening and closing doors 23 define entrances having steps 24. The steps 24 are attached to the tractor body 5 through front, rear, right and left rubber cushions.

The rear posts 19 of cab 17 are L-shaped, i.e. bent in halfway positions 19A. The bent positions 19A are located adjacent a vertical plane intersecting a pivotal axis (arm axis) of the lift arms 9. Thus, the entire cab 17 is forwardly shifted by approximately 5 cm relative to the tractor body 5, compared with a conventional cab. Thus, the tractor as a whole has its center of gravity shifted forward. A good fore and aft balance is maintained when the rotary implement 12 is vertically movably attached to the tractor. As a result, the entire tractor has a reduced weight, and is operable on wet, soft soil with little trouble.

Figure 2:
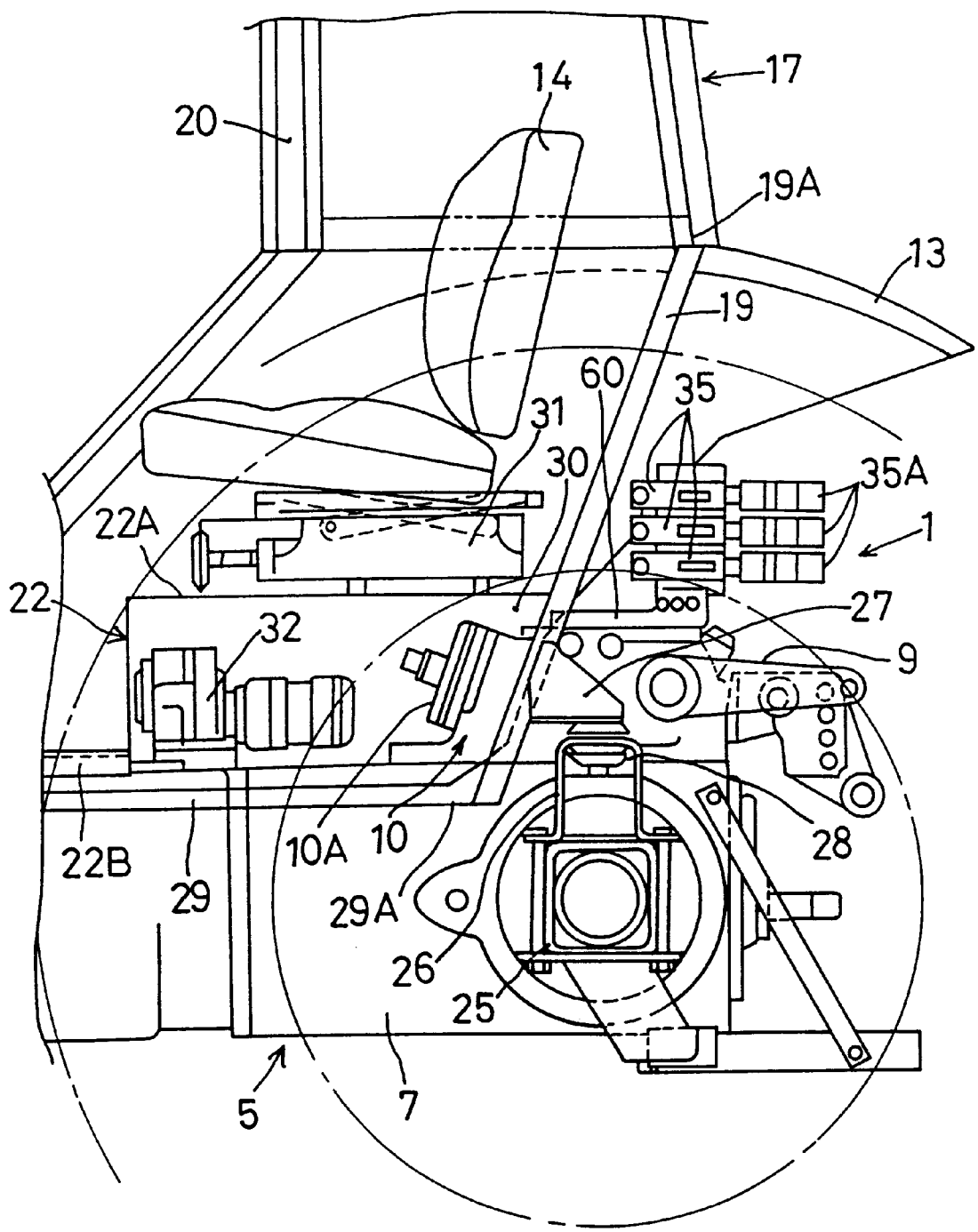

Referring to FIG. 2, rear axle cases 25 have a hat type support base 26 bolted thereto. The rear posts 19 of cab 17 are mounted on the tractor body 5 as connected to the support base 26 through brackets 27 and vibration proofing supports 28. A pair of right and left lower elements 29 are fixed to the lower ends of rear posts 19. These lower elements 29 extend forward to be connected to the right and left front posts 18.

Conventionally, lower rear surfaces 29A of the right and left lower elements 29 are attached to the hat type support base 26 through the vibration proofing supports 28. In the embodiment of this invention, on the other hand, the rear posts 19, with the bent halfway positions 19A, have lower portions located forwardly of the rear axle cases 25. These rear posts 19 are mounted to the tractor body 5 through the brackets 27 and vibration proofing supports 28. As noted above, the cab 17 is forwardly shifted by approximately 5 cm compared with a conventional cab. However, with the lower portions of rear posts 19 inclined upward and rearward, the cab 17, though located further forward than the conventional cab, provides the same accommodation space for the driver as the conventional cab. Since the cab 17 is located further forward than the conventional cab, a space is secured for raising the working implement lifting hydraulic device 10 mounted on the upper surface of tractor body 5 in time of a maintenance operation for the hydraulic device 10.

The hydraulic device 10 has a head 10A covered from above by the seat support portion 22A of floor sheet 22. The driver's seat 14 is mounted on the support portion 22A through a seat support 31. The driver's seat 14 may be detached along with the seat support 31 from the support portion 22A. For maintaining the hydraulic device 10, the driver's seat 14 and seat support 31 are detached to expose an opening (not shown) formed in the support portion 22A. Through this opening, access is made from above to bolts fixing the hydraulic device 10 to the tractor body 5, to loosen the bolts. Then, the hydraulic device 10 may be lifted in a space 30 and withdrawn rearwardly therefrom.

The transmission case 7 supports a hydraulic pump 32 driven by the engine 6, in a position forwardly of the hydraulic device 10. The hydraulic pump 32 may be maintained along with the head 10A of hydraulic device 10 through the opening (not shown) formed in the seat support portion 22A of floor sheet 22.

Usually (conventionally) the hydraulic pump 32 is disposed adjacent a side surface of engine 6. In this embodiment, the hydraulic pump 32 is disposed on the upper surface of transmission case 7. The transmission case 7 acts also as a hydraulic oil tank. With the hydraulic pump 32 disposed on the upper surface of transmission case 7, pipings may be dispensed with or may have reduced lengths. Further, where the hydraulic pump 32 is disposed laterally of engine 6, the front wheels 3 are allowed a limited steering angle. The construction in this embodiment eliminates such a drawback also.

The center of gravity of the tractor body may be shifted forward by forming the seat support portion 22A of floor sheet 22 with a thin plate, and the forward portion 22B with a thick plate. Even where the support portion 22A formed of a thin plate, strength of the support portion 22A may be secured by stays (not shown) fixed peripherally of the opening in the support portion 22A for reinforcing the seat support 31.

Figure 3:
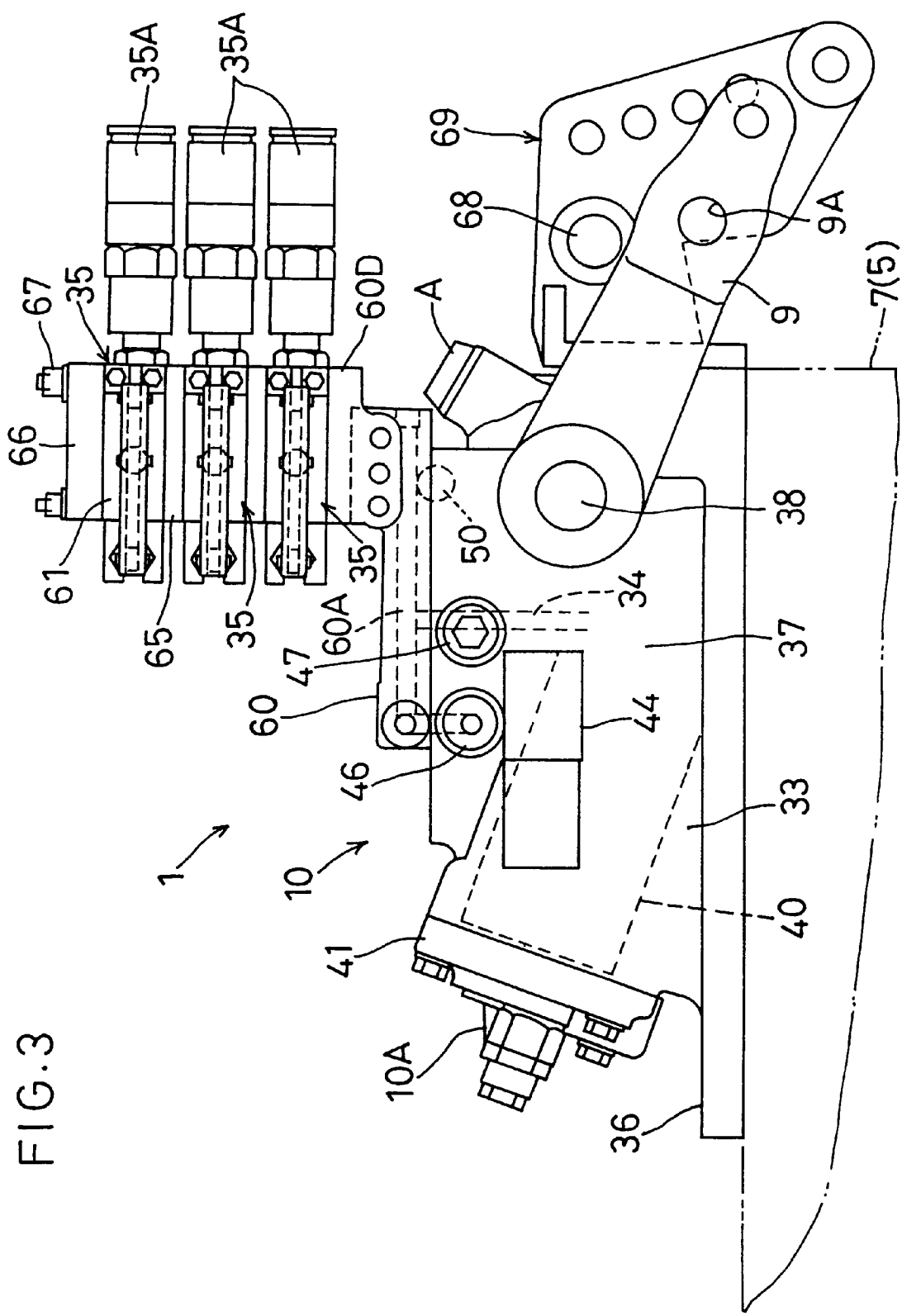
Figure 4:
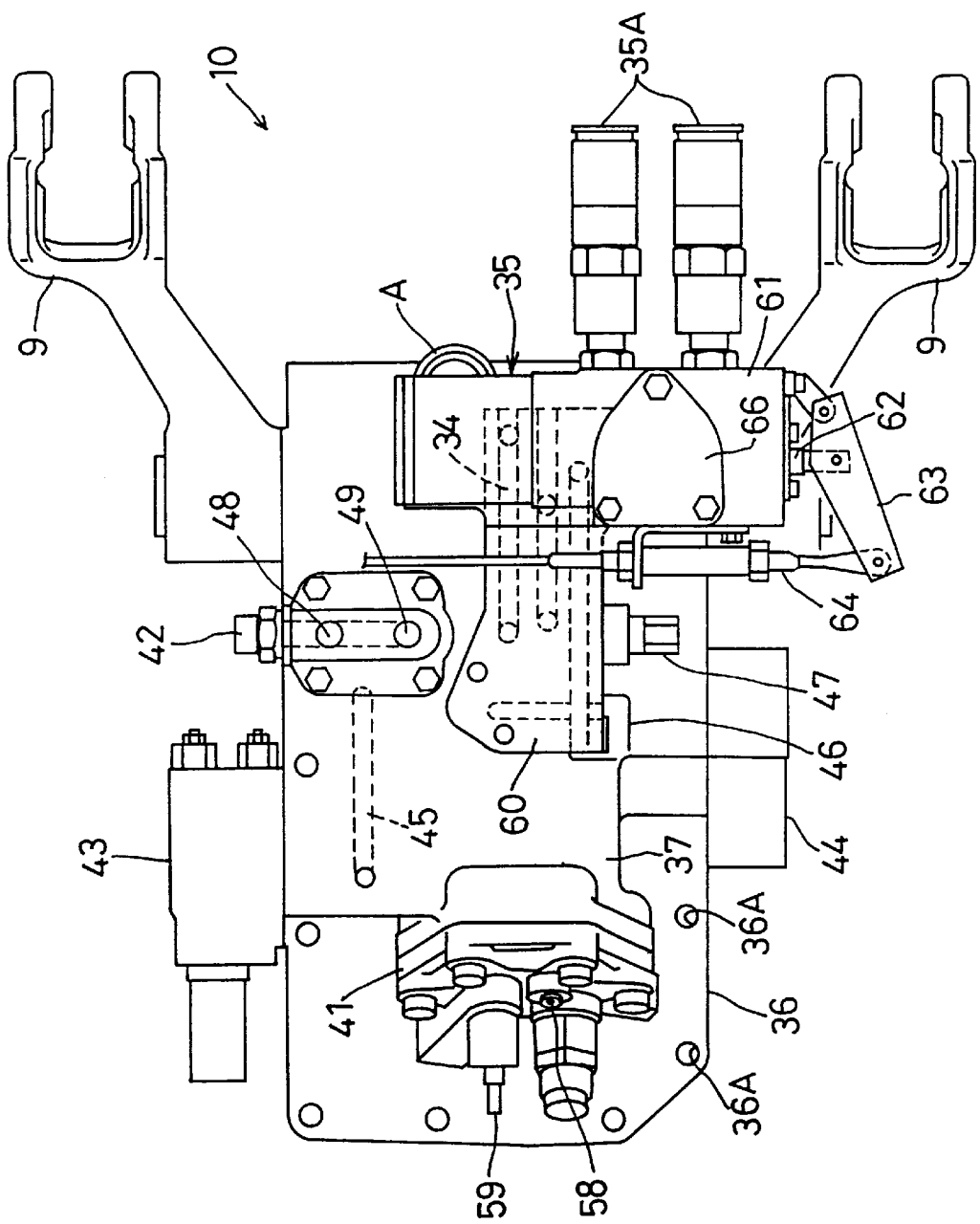
Figure 5:
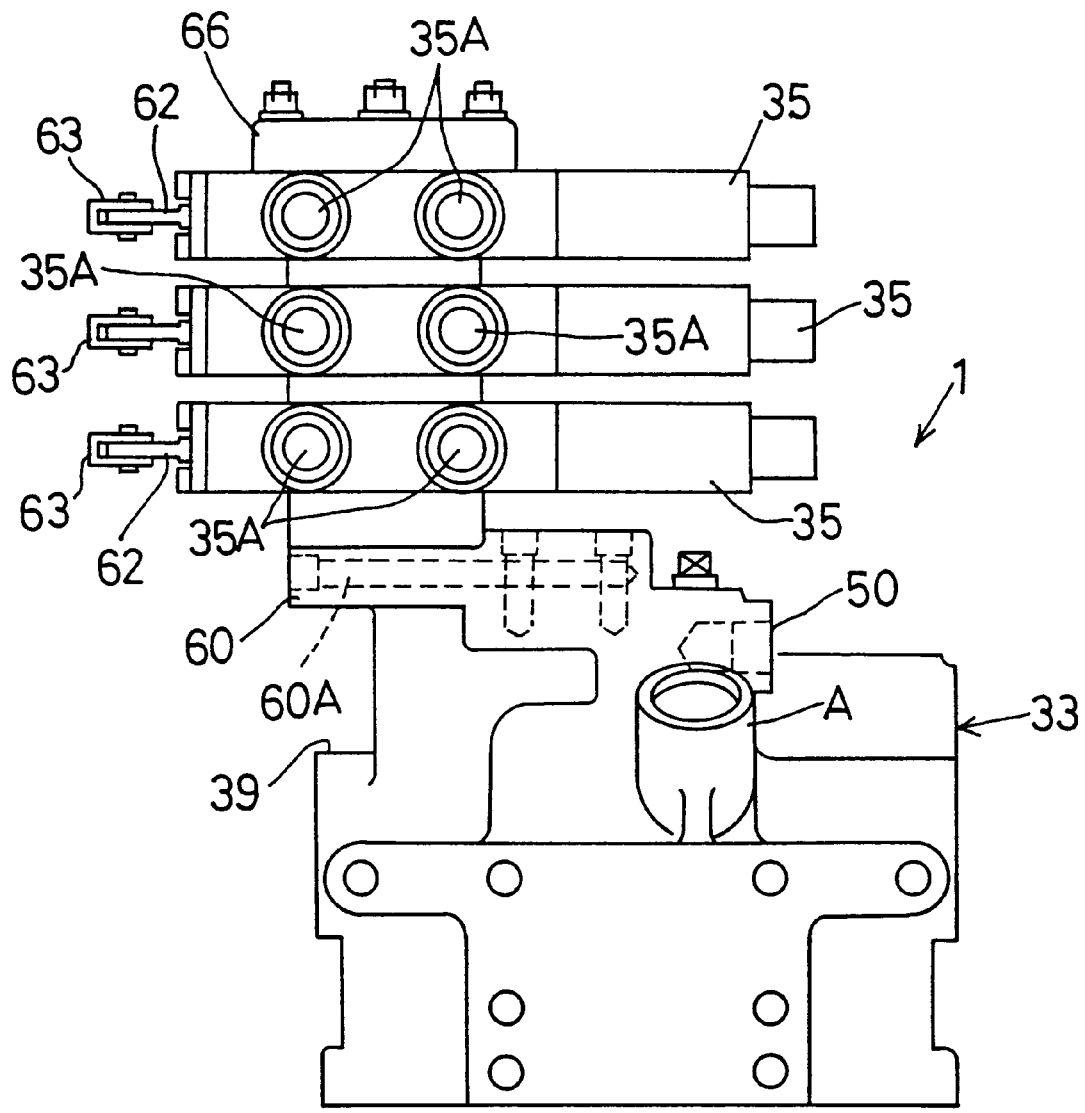

FIGS. 3 through 5 show the hydraulic pressure takeout apparatus 1 in a first embodiment of this invention. The hydraulic pressure takeout apparatus 1 is attached to the working implement lifting hydraulic device 10 having the right and left lift arms 9. The hydraulic device 10 includes a hydraulic housing (main body of a hydraulic cylinder) 33 defining oil lines 34 therein. These oil lines 34 communicate with hydraulic pressure takeout valves 35. The valves 35 are arranged above the hydraulic housing 33 and between the right and left lift arms 9.

The hydraulic housing 33 is made of cast metal, and has mounting bores 36A formed in a seat portion 36 for connection to the transmission case 7. A main body 37 is formed to bulge from the seat portion 36. The main body 37 has a pair of right and left bosses 39 formed on right and left rear walls thereof for pivotally supporting the arm axis 38 of lift arms 9. The main body 37 further includes a cylinder tube 40 mounted in an upwardly and forwardly inclined posture in a forward portion thereof. A piston is sidably fitted in the cylinder tube 40. Numeral 41 denotes a head lid for closing an end opening of the cylinder tube 40. When the hydraulic housing 33 is placed to overlie an opening in the upper surface of transmission case 7, the seat portion 36 is fixed to the transmission case 7 by bolts mounted vertically.

The hydraulic housing 33 has an inlet port (main port) 42 formed in a side wall thereof (a right side wall in FIG. 4) for receiving hydraulic oil from the hydraulic pump 32. The port 42 has a screw pipe construction for detachably attaching a piping thereto.

The hydraulic housing 33 further defines a hydraulic pressure takeout port 48, a neutral port 49 and a drain port 50 for use when a front loader is attached to the tractor 2.

Figure 6:
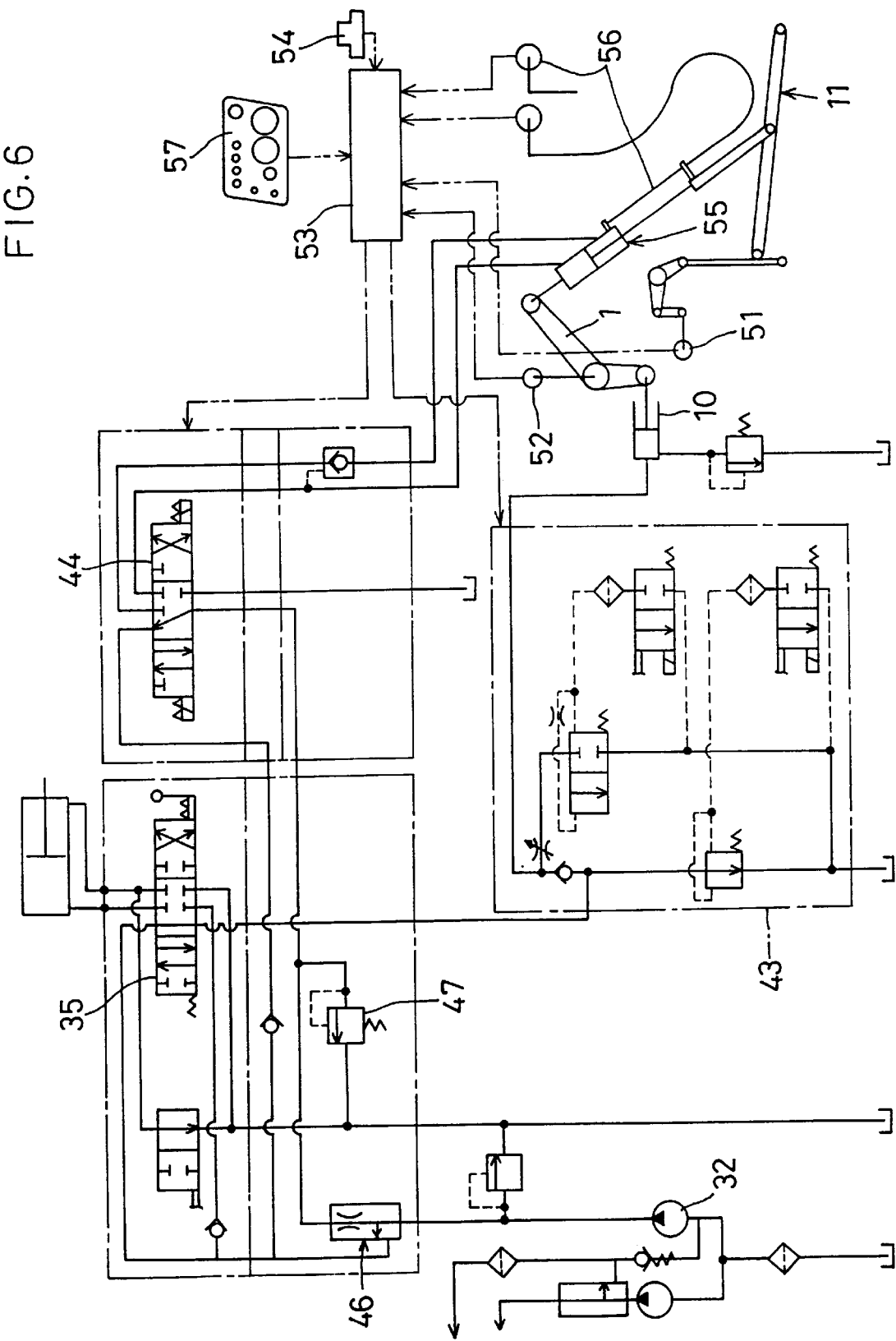
Figure 7:
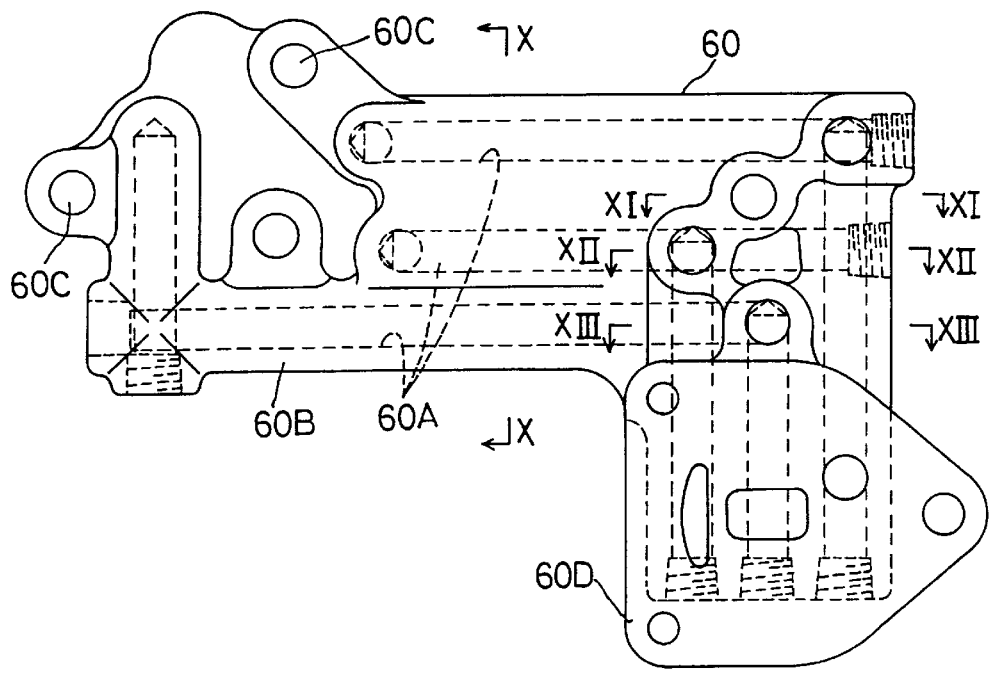
Figure 8:
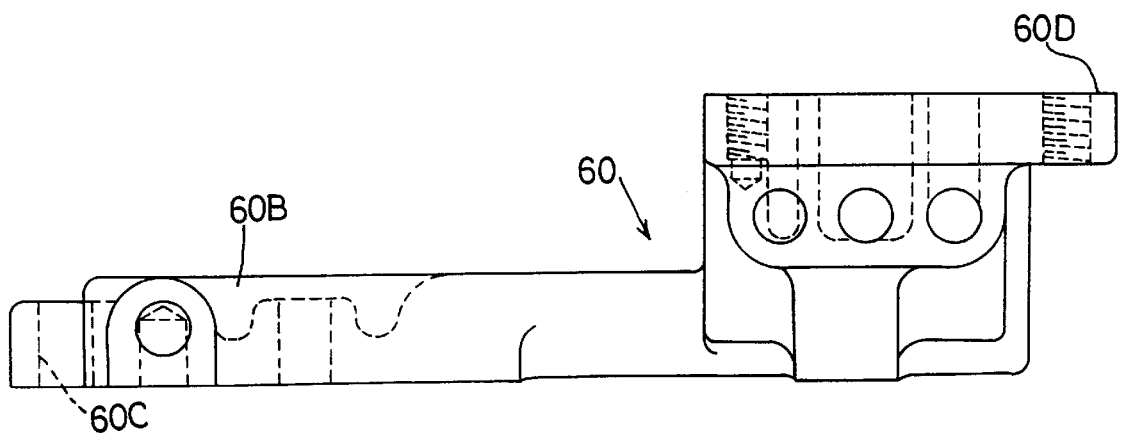
Figure 9:
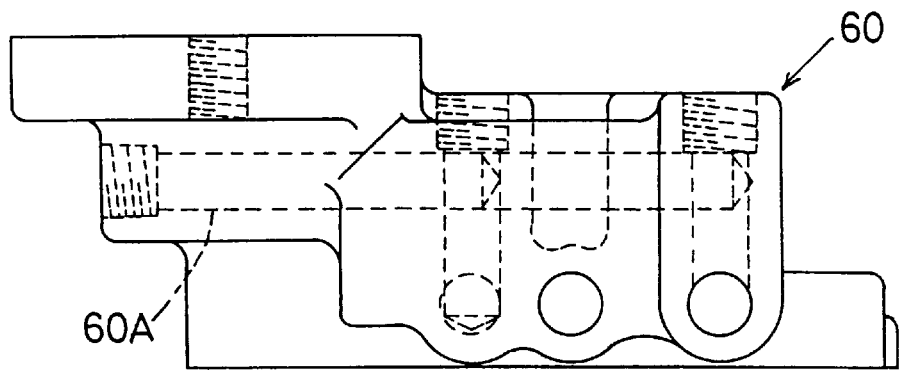
Figure 10:
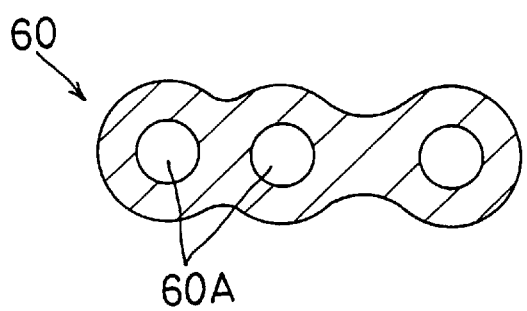
Figure 11:
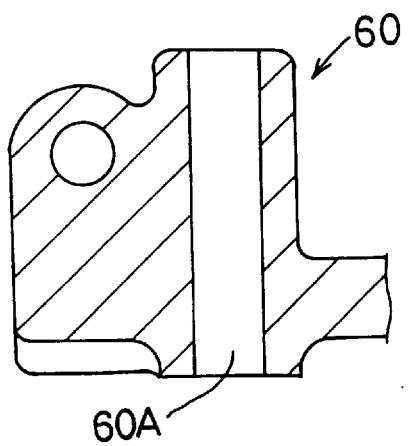
Figure 12:
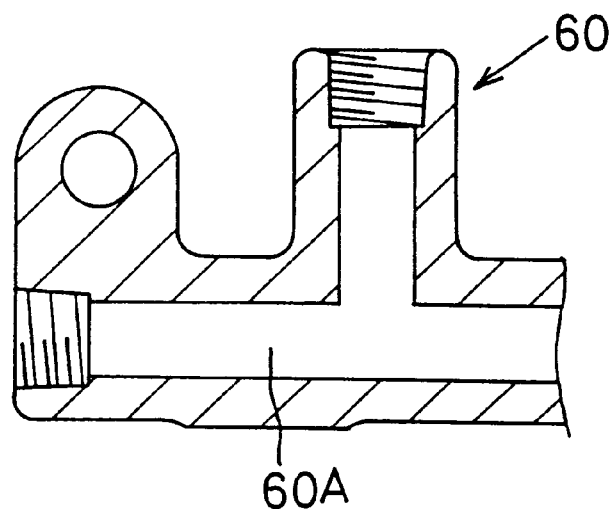
Figure 13:
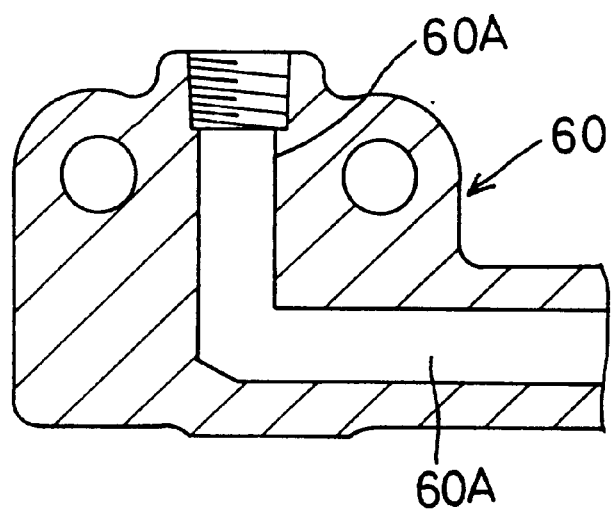

As also shown in FIG. 6, the hydraulic housing 33 has a draft control valve assembly 43 and a level control valve 44 distributed right and left. The hydraulic housing 33 also has oil lines 45 (FIG. 4), a priority valve 46 and a relief valve 47 connected these valves 43 and 44.

The draft control valve assembly 43 is an electromagnetic pilot valve integrating solenoid valves for ascent and descent and a pilot changeover valve. A draft sensor 51 and a lift arm sensor 52 transmit signals to a control box 53 which transmits a control signal for performing auto draft control.

The level control valve 44 controls a lift cylinder 55 based on signals transmitted to the control box 53, such as a signal from a roll sensor 54 mounted on the tractor 2, and a signal from a stroke sensor 56 attached to the lift cylinder (lift rod) 55 of the three-point linkage 11.

The controls performed by the control box 53 may be set or changed by operating a switch box 57. Draft/position control may be effected manually instead of the auto control (as described in the second embodiment). The hydraulic housing 33 defines a bore for attaching levers and the like to enable the manual control. In time of the auto control, the bore is covered with a removable lid.

Each lift arm 9 defines mounting bores 9A for attaching a hydraulic cylinder (assistance cylinder) for producing lift. The head lid 41 defines a hydraulic pressure takeout port for this cylinder, and has a fall adjusting valve 59 for controlling the lift arms 9.

Referring to FIGS. 3 through 5, each hydraulic pressure takeout valve 35 includes a valve case 61, and a switching spool 62 mounted therein. The spool 62 is switchable by a control force transmitted to a swing arm 63 through a push-pull cable or Bowden cable 64. Each valve 35 has hydraulic pressure takeout portions 35A in the form of quick couplers for detachably attaching hydraulic pressure takeout hoses.

The valves 35 may be attached directly to the upper surface of hydraulic housing 33. In the illustrated example, however, a spacer 60 is disposed between the valves 35 and the hydraulic housing 33. The spacer 60 defines oil lines 60A communicating with the oil lines 34.

Only one valve 35 may be provided. In the illustrated example, a plurality of valves 35 are stacked with intermediate spacers 65 and a head spacer 66, and are detachably connected to one another by bolts 67. The intermediate spacers 65 define oil lines (not shown) therein. The hydraulic pressure takeout portions 35A extend rearwardly on horizontal planes to facilitate attachment and detachment of the hydraulic pressure takeout hoses.

With the hydraulic housing 33 defining the oil lines 34 therein for communication with the hydraulic pressure takeout valves 35, no exposed piping is required. When the spacer 60 and intermediate spacers 65 are stacked on the hydraulic housing 33, the oil lines formed in these components may reliably be positioned relative to one another, and mating surfaces thereof may reliably be sealed, to preclude possibility of oil leakage. In addition, since the valves 35 are disposed between the right and left lift arms 9, neither the valves 35 nor the hydraulic pressure takeout hoses are obstructive to raising and lowering of the lift arms 9.

The hydraulic housing 33 has a mount 69 attached to a vertical rear surface thereof for connecting a top link of three-point linkage 11. The top link mount 69 includes a torsion bar 68 acting as a load sensor and draft sensor. The hydraulic housing 33 has also a feed plug A attached to the vertical rear surface thereof for supplying hydraulic oil to the transmission case 7. As shown in FIGS. 4 and 5, the feed plug A is offset right or left (left in the illustrated example), to reduce the possibility of interference between the three-point linkage 11 and valves 35 when the three-point linkage 11 is raised and lowered. As a result, a sufficient lifting angle is secured for the three-point linkage 11 (and thus the right and left lift arms 9).

FIGS. 7 through 13 show details of the spacer 60 having the oil lines 60A. The spacer 60 has a plurality of bolt receiving bores 60C formed in a seating portion 60B connected to the hydraulic housing 33. The spacer 60 is detachably attached to the upper surface of hydraulic housing 33 by bolts inserted vertically through the bolt receiving bores 60C. That is, the valves 35 are detachably attached through the spacer 60 to the hydraulic housing 33 attached to the tractor body 5.

The spacer 60 further includes a mounting seat 60D bulging therefrom for attaching the valves 35. The valves 35 are detachably attached along with the intermediate spacers 65 and head spacer 66 to the mounting seat 60D by bolts 67 (FIG. 3). Thus, the valves 35 are attachable and detachable while leaving the spacer 60 attached to the hydraulic housing 33, to facilitate maintenance.

Figure 14:
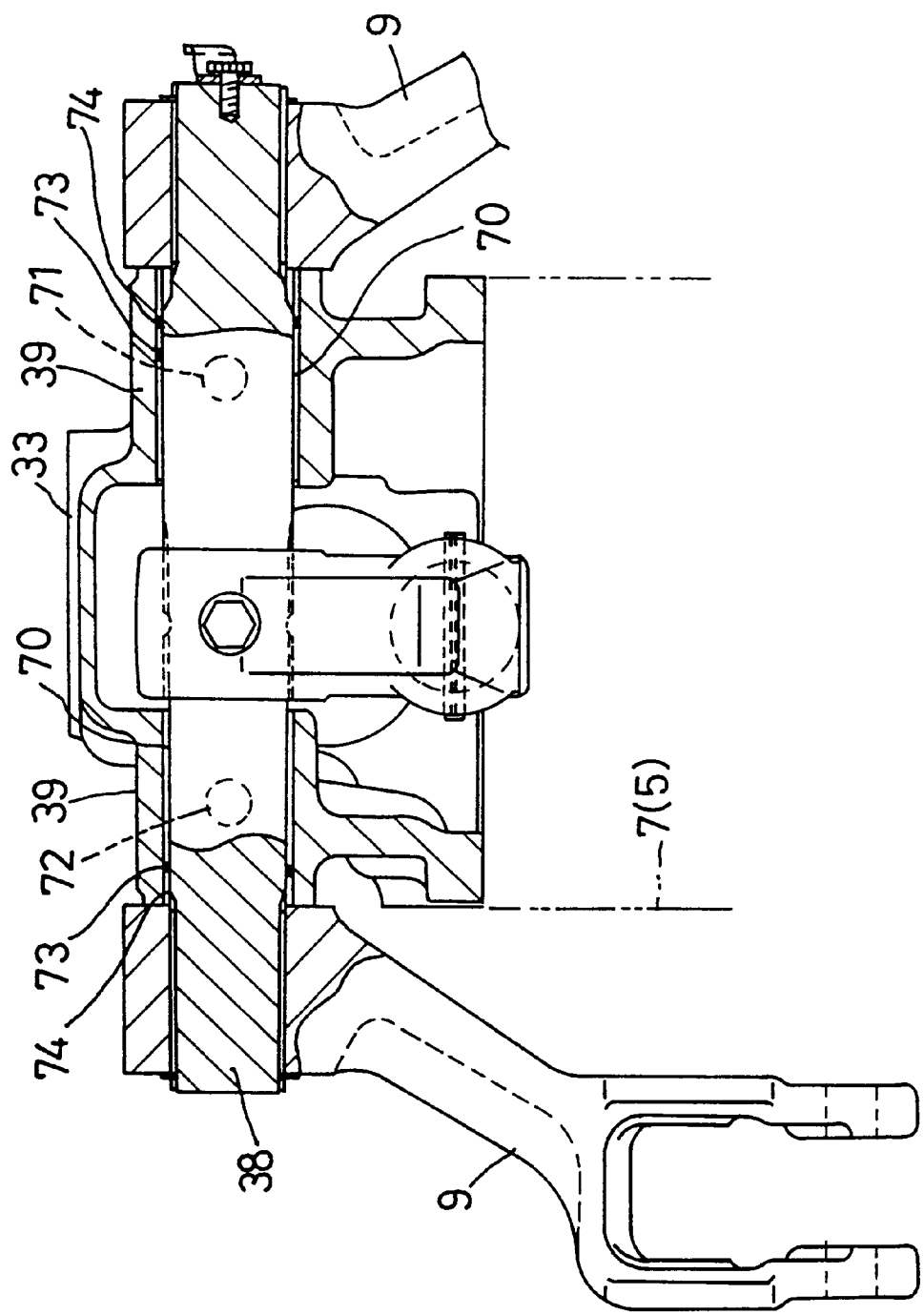

Referring to FIG. 14, the arm axis 38 of lift arms 9 extends through the pair of tubular bosses 39 formed laterally of the hydraulic housing 33. A tubular bushing 70 is disposed between the arm axis 38 and each boss 39.

The bushing 70 is readily seized by microvibration, and must therefore be lubricated. For this purpose, this embodiment utilizes the draft control valve assembly 43 and level control valve 44 distributed right and left of the hydraulic housing 33. A piping element 71 is connected to a return oil port (tank port) of the draft control valve assembly 43 communicating with the transmission case 7. Part of return oil is transmitted to the right bushing 70 through the piping element 71 to lubricate the bushing 70 forcibly. On the other hand, a piping element 72 is connected to a return oil port (tank port) of the level control valve 44 communicating with the transmission case 7. Part of return oil is transmitted to the left bushing 70 through the piping element 72 to lubricate the bushing 70 forcibly. As shown in FIG. 14, an O-ring 73 and collar 74 are disposed outwardly of each bushing 70 to prevent leakage of the return oil. The remainder of the oil having formed oil film in each bushing 70 is returned to the transmission case 7.

A mechanically operable (manually operable) draft control valve may be provided in place of the draft control valve assembly 43 at the right side of hydraulic housing 33. In this case, the piping element 71 is connected to the tank port of this draft control valve.

The piping elements 71 and 72 may be arranged longitudinally of the hydraulic housing 33 so as to overlie the hydraulic housing 33. Thus, the two piping elements 71 and 72 may be arranged with ease. The piping elements 71 and 72 may be in the form of bores in the hydraulic housing 33.

As noted above, the hydraulic housing 33 defines oil lines 34 for hydraulic pressure takeout, and oil lines 45 communicating with the valves 43 and 44. Although the hydraulic housing 33 has a large capacity, the hydraulic device 10 for raising and lowering the working implement is lightweight as a whole. Such light weight is meaningful particularly where the tractor often engages in an operation on wet, soft soil.

The second embodiment of this invention will be described next with reference to FIGS. 15 through 18. In the second embodiment, the hydraulic takeout apparatus 1 according to this invention is applied to a tractor 2 having a canopy 75, and the draft control valve assembly 43 is mechanically controllable (manually controllable) instead of being automatically controllable. Like reference numerals are used to identify like parts which are the same as in the first embodiment. Different aspects will be described hereinafter.

Figure 15:
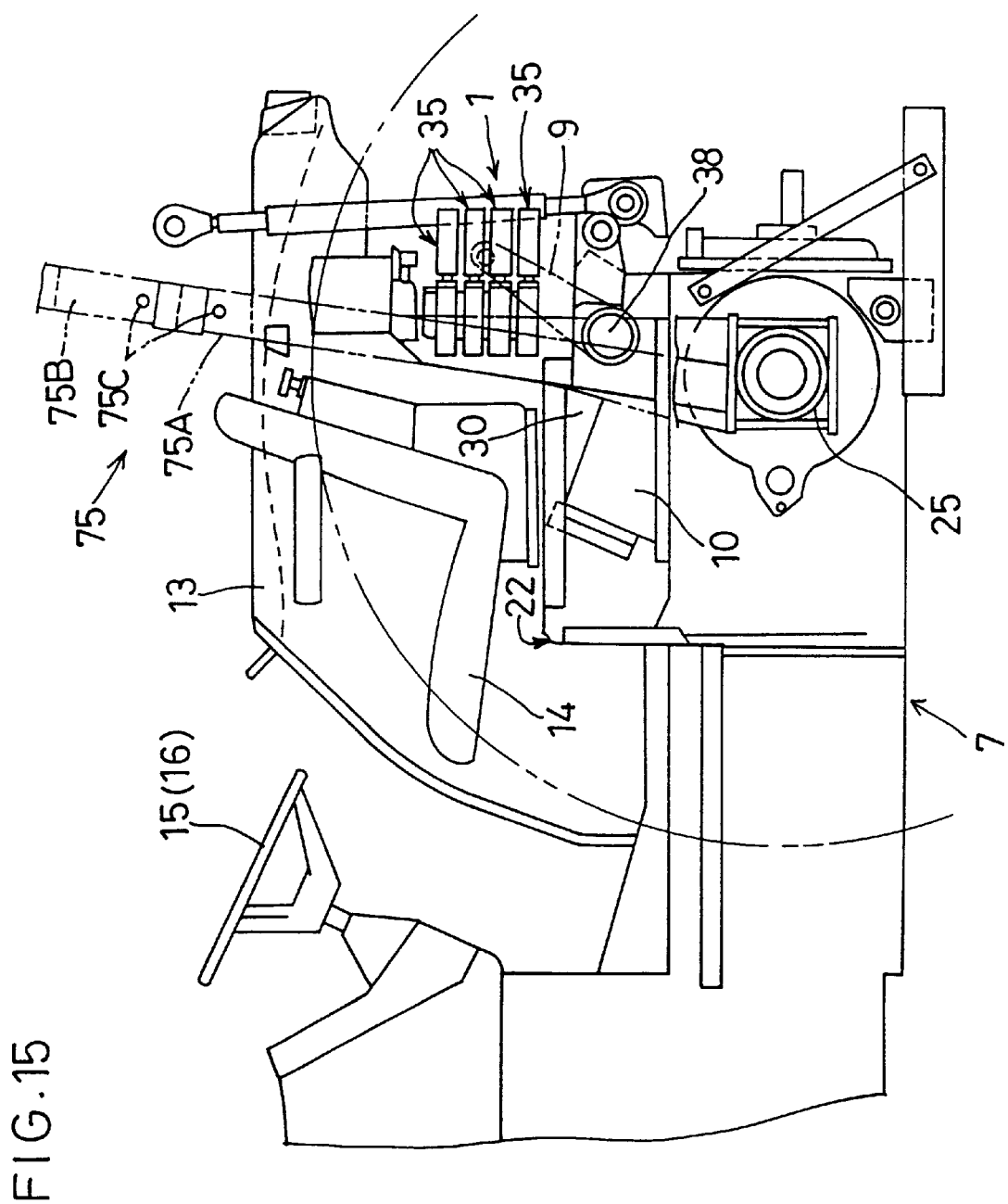
Figure 16:
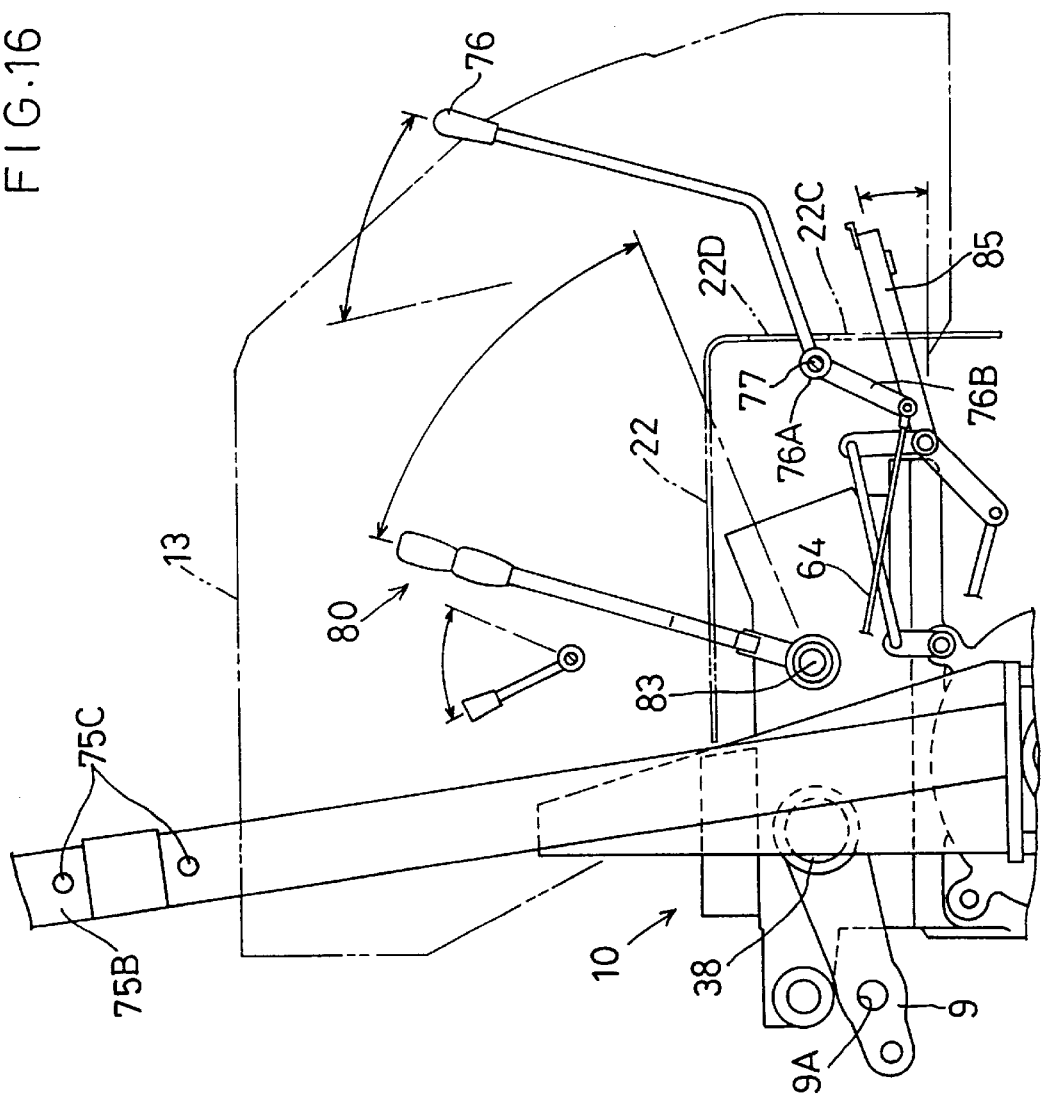

In FIGS. 15 and 16, the canopy 75 includes lower posts 75A extending upward from the right and left rear axle cases 25 to positions adjacent the upper surfaces of rear fenders 13, and upper posts 75B removably inserted into and fixed by bolts 75C to upper portions of the lower posts 75A.

The valves 35 of hydraulic takeout apparatus 1 stacked on the hydraulic housing 33 are remote-controlled by control levers 76 through Bowden cables 64 (four valves 35 are stacked in this embodiment). The control levers 76 are arranged at the right side of driver's seat 14 and attached to the floor sheet 22 through a transverse pivotal axis 77. The floor sheet 22 has an opening formed in a stepped portion 22C thereof, and the levers 76 project from this opening.

Figure 17:
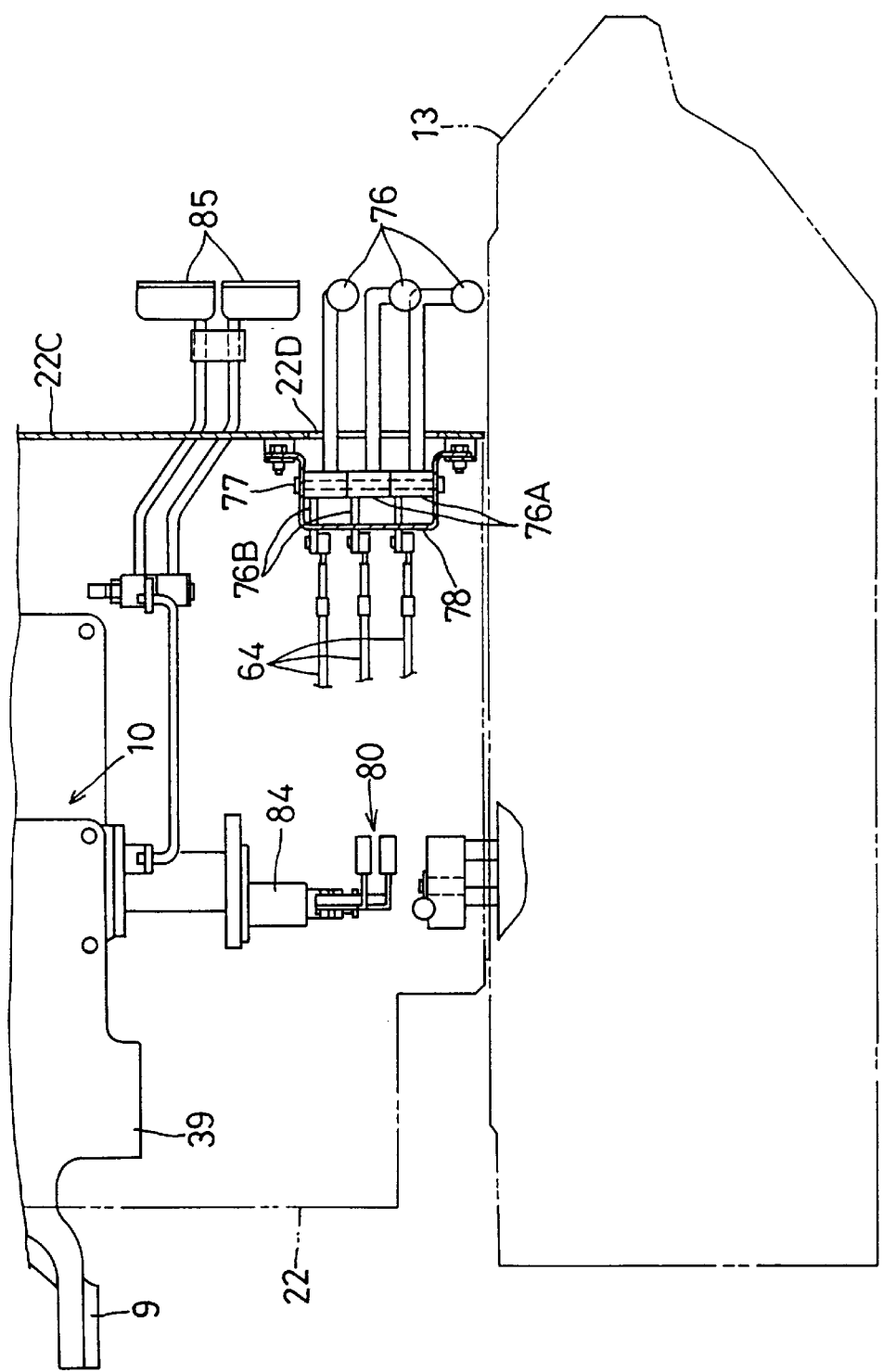

As shown in FIG. 17, a bracket 78 is bolted to the stepped portion 22C to reinforce right and left sides of the opening 22D formed in the stepped portion 22C. The bracket 78 supports the pivotal axis 77, and the control levers 76 have tubular portions 76A formed at proximal ends thereof and rotatably fitted on the pivotal axis 77. The Bowden cables 64 are connected through metal fittings 79 to arms 76B extending from the proximal tubular portions 76A. The cables 64 extend from the right side over the hydraulic housing 33 and a position rearwardly of driver's seat 14 to the left side. (These control levers 76 and the like are employed also in the first embodiment shown in FIGS. 1 through 14).

Figure 18:
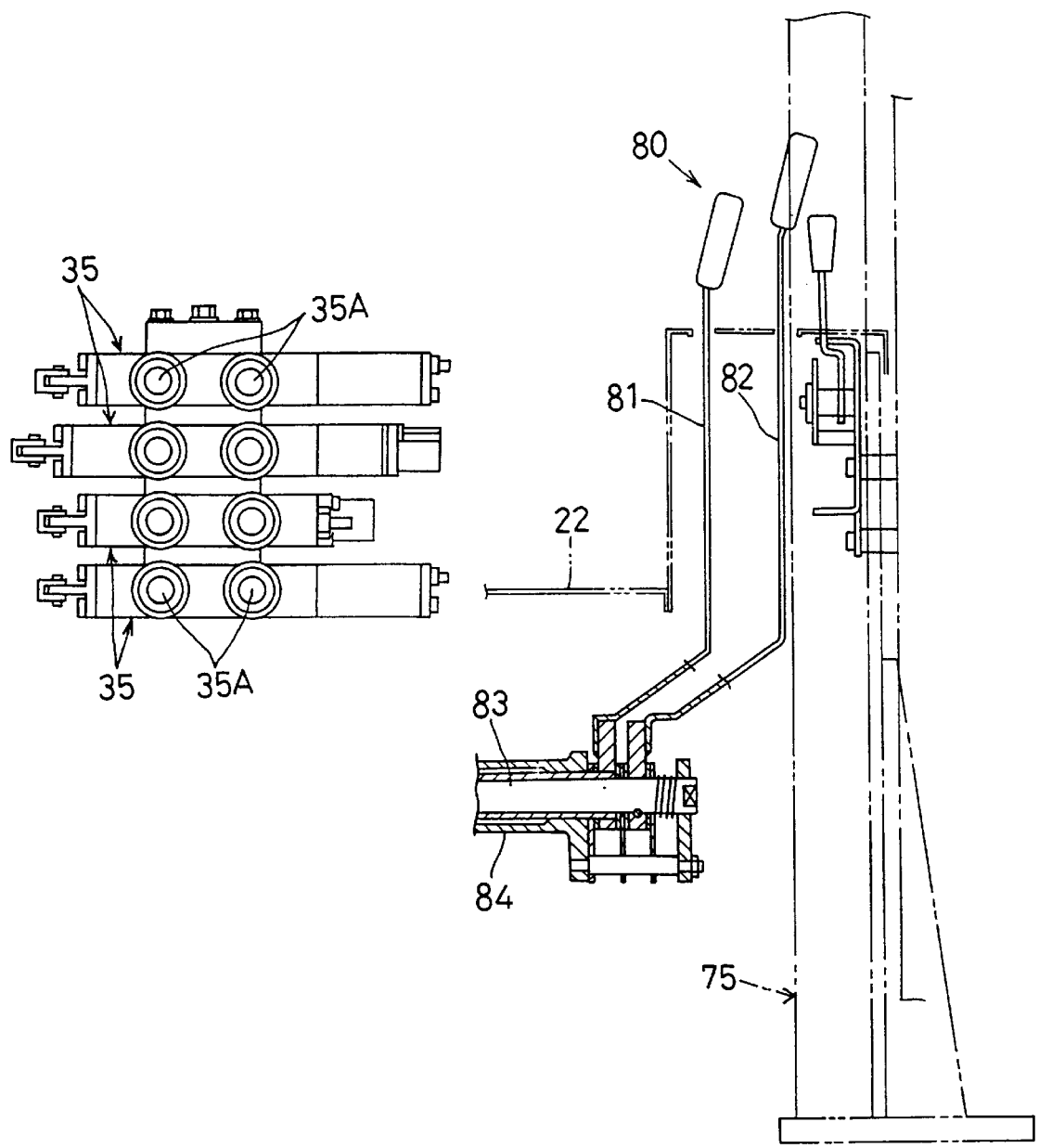

The second embodiment includes manually operable hydraulic control levers 80 in place of the auto draft controller. As shown in FIG. 18, the levers 80 include a position lever 81 and a draft lever 82. A support arm 84 projects outside through and closes an opening formed in the right side of hydraulic housing 33. The support arm 84 has inner and outer control shafts 83 mounted therein. The control shafts 83 are rotatable by fore and aft rocking of the levers 81 and 82, thereby operating valves of a manual draft controller (not shown) mounted in the hydraulic housing 33 and mechanically interlocked to the shafts 83.

Numeral 85 in FIGS. 16 and 17 denotes foot-operated differential lock pedals juxtaposed for acting on the front wheels and rear wheels, respectively.

The hydraulic pressure takeout apparatus 1 according to this invention may be employed also on a tractor not having the cabin 17 or canopy 75. Further, the valves 35 of hydraulic pressure takeout apparatus 1 may be arranged sideways instead of the vertical arrangement as illustrated.

The draft control valve assembly, particularly the auto draft control valve assembly, requires frequent maintenance operations. Thus, employing this invention therefor has special significance. This invention may advantageously be employed for the manually operable draft control valve assembly also.

What is claimed is:

1. A hydraulic pressure takeout apparatus for use on a tractor having a hydraulic pressure source, right and left lift arms disposed at a rear region of a tractor body, and a hydraulic device to which hydraulic pressure is supplied from said hydraulic pressure source, comprising:

a valve mounting portion supported at a rear region of said tractor body;

a hydraulic pressure takeout valve assembly mounted on said valve mounting portion and between said right and left lift arms, for effecting the takeout of the pressure oil supply from said hydraulic pressure source to said hydraulic device, said valve assembly having a plurality of valves stacked one upon another, wherein said valve assembly further includes a plurality of hydraulic pressure takeout portions, said hydraulic pressure takeout portions extending rearwardly on horizontal planes and open rearwardly of said tractor body to facilitate attachment/detachment of hydraulic pressure takeout hoses of an implement connectable to said tractor; and oil lines extending from said hydraulic pressure source through to said hydraulic pressure takeout valve assembly.

2. A hydraulic pressure takeout apparatus as defined in claim 1, wherein said valve assembly is attached to said valve mounting portion through a spacer having connecting oil lines in communication with said oil lines.

3. A hydraulic pressure takeout apparatus as defined in claim 1, wherein each adjacent pair of said valves are stacked on upon another by an intermediate spacer defining a connecting oil line therein communicating with said valves.

4. A hydraulic pressure takeout apparatus as defined in claim 1, wherein said valve assembly has hydraulic pressure takeout portions in form of quick couplers for detachably attaching hydraulic pressure takeout hoses.

5. A hydraulic pressure takeout apparatus as defined in claim 1, wherein said valve mounting portion is a hydraulic housing, wherein said valve assembly is mounted on said hydraulic housing by a spacer or defining connecting oil lines therein communicating with said oil lines.

6. A hydraulic pressure takeout apparatus as defined in claim 1, wherein said oil lines extend from said hydraulic pressure source through to said valve assembly without said oil lines being exposed to outside, and wherein said valve assembly is mounted on said tractor body by a spacer having connecting oil lines inside communicating with said oil lines.

* * * * *